(12) United States Patent
Dennis et al.

(10) Patent No.: US 8,235,183 B2
(45) Date of Patent: Aug. 7, 2012

(54) BALL RAMP BRAKE

(75) Inventors: Brian P. Dennis, Kalamazoo, MI (US);
LynRoy Palmer-Coleman, Coloma, MI (US); Howard H. Baldeosingh, St. Joseph, MI (US); Brett A. Starr, Michigan City, IN (US); Kenneth A. Dodd, Dowagiac, MI (US); David Alley, Granger, IN (US); Peter J. Pozivilko, Saint Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 838 days.

(21) Appl. No.: 12/321,476

(22) Filed: Jan. 22, 2009

(65) Prior Publication Data
US 2009/0211855 A1 Aug. 27, 2009

Related U.S. Application Data

(60) Provisional application No. 61/066,819, filed on Feb. 25, 2008.

(51) Int. Cl.
*F16D 55/36* (2006.01)
(52) U.S. Cl. .................. 188/71.5; 188/70 B; 188/71.7; 188/72.7; 188/264 E; 188/264 D
(58) Field of Classification Search ............... 188/70 B, 188/71.5–71.7, 72.7, 262 E, 264 D
See application file for complete search history.

(56) References Cited

U.S. PATENT DOCUMENTS

| | | | | |
|---|---|---|---|---|
| 1,843,594 A | * | 2/1932 | Baker | 188/194 |
| 2,091,270 A | | 8/1937 | Colman | |
| 2,956,649 A | * | 10/1960 | Kelley | 188/264 E |
| 3,124,216 A | * | 3/1964 | Buyze | 188/71.4 |
| 3,734,242 A | * | 5/1973 | Klaue | 188/71.4 |
| 3,952,843 A | * | 4/1976 | Campbell et al. | 188/71.4 |
| 4,352,415 A | * | 10/1982 | Powell | 188/156 |
| 4,653,614 A | * | 3/1987 | Price et al. | 188/70 B |
| 5,019,021 A | * | 5/1991 | Janson | 475/150 |

(Continued)

FOREIGN PATENT DOCUMENTS
DE 3146818 6/1983
(Continued)

OTHER PUBLICATIONS

Drawing No. AA-551 Auto Specialties Mfg. Co., St. Joseph Michigan (May 1, 1948).

(Continued)

*Primary Examiner* — Bradley King
*Assistant Examiner* — Mahbubur Rashid
(74) *Attorney, Agent, or Firm* — Renner, Kenner, Greive, Bobak, Taylor & Weber (57) ABSTRACT

A ball ramp brake including a housing, a disc assembly within the housing, and an annular rotatable actuator to actuate the brake by compressing the disc assembly. The rotatable actuator includes a plurality of depressions oriented circumferentially therein which become progressively shallower in a first circumferential direction. A plurality of depressions are circumferentially oriented in a surface of the housing and become progressively shallower in a second circumferential direction. The depressions in the actuator and the depressions in the housing each have a first angle of depression that is steeper than a second angle of depression. A boot seal may be provided between the fluid chamber of an actuating cylinder and the inner area within the housing to prevent fluid leakage. In addition, a cooling chamber may be provided in the housing to improve the brakes efficiency.

6 Claims, 13 Drawing Sheets

U.S. PATENT DOCUMENTS

| | | | |
|---|---|---|---|
| 5,092,825 A * | 3/1992 | Goscenski et al. | 475/150 |
| 5,106,348 A * | 4/1992 | Koivunen | 475/126 |
| 5,106,349 A | 4/1992 | Botterill et al. | |
| 6,571,928 B1 | 6/2003 | Gassmann | |
| 6,793,055 B2 * | 9/2004 | Kasuya et al. | 192/35 |
| 2007/0144838 A1 * | 6/2007 | Pozivilko | 188/72.7 |

FOREIGN PATENT DOCUMENTS

| | | |
|---|---|---|
| DE | 102005041342 | 11/2006 |
| EP | 0157236 | 10/1985 |

OTHER PUBLICATIONS

Drawing No. 73710 Ausco Products, Inc., Benton Harbor, Michigan (Sep. 11, 1992).

Drawing No. 73800 Ausco Products, Inc., Benton Harbor, Michigan (Aug. 5, 1992).

Brochure of Knott Brake Company, Lodi, Ohio (undated but prior to the invention of the Application) (6 pages).

European Search Report, Jul. 5, 2009.

* cited by examiner

BALL RAMP BRAKE

CROSS REFERENCE TO RELATED APPLICATION

This Application claims priority from U.S. Provisional Patent Application Ser. No. 61/066,819 filed on Feb. 25, 2008.

TECHNICAL FIELD

This invention relates to a ball ramp brake with a rotatable actuator. More specifically, this invention relates to such a brake including an integrated cooling chamber, a two-stage ball ramp actuation system, and a two fluid separation system.

BACKGROUND ART

Ball ramp caliper brakes are a useful and convenient means of providing a braking force. Generally such brakes include a rotatable actuator and a stationary surface, each of which have depressions which are circumferentially spaced around an axis, and which become progressively deeper in one circumferential direction. Steel balls are held within these depressions and when the rotatable actuator is caused to rotate, the balls roll gradually along the depressions away from the deeper end. This in turn causes the rotatable actuator to move axially away from the stationary surface thereby applying a braking force to a disc assembly. These brakes are relatively simple in design because they do not require complex hydraulic mechanisms. Thus, the brakes are relatively dependable and easy to service and operate. Nevertheless, some deficiencies exist in prior art ball ramp brakes.

One such deficiency is the tendency for the ball ramp brakes to overheat. The disc assembly of the ball ramp brake contains a plurality of stationary discs and a plurality of rotating discs all coaxially mounted on a rotating shaft. During normal operation, the discs are separated by a clearance allowing the rotating discs to rotate freely between the stationary discs. When the brake is actuated, a vehicles momentum is converted into heat by the friction between the rotatable and stationary discs within the disc assembly. This heat is transferred to a fluid within the brake chamber, which is typically an oil. Due to the high amount of heat produced, and the lack of adequate cooling means for the fluid within the housing of the brake, there has been a tendency for the brake to overheat and, consequently, lose braking power. A previously attempted solution to the overheating problem was to provide a higher volume of lubricant within the disc chamber in order to increase the lubricant's ability to absorb heat. However, the additional volume of lubricant lowered the efficiency of the ball ramp brake.

Another deficiency in prior art ball ramp brakes relates to the braking force applied to the disc assembly by the rotatable actuator. The ramp angle of the depressions within the rotatable actuator and stationary surface are directly related to both the response time of the brake as well as the mechanical advantage generated by the actuator. In prior art ball ramp brakes, a steep ramp angle is typically provided in order to decrease the amount of rotation needed in order to engage the disc assembly. This steep angle, however, reduces the mechanical advantage of the actuator and lowers the force applied to the disc assembly. If the ramp angle is reduced in order to increase the mechanical advantage, then the shallow ramp angle increases the amount of rotation needed in order to engage the disc assembly, and thereby increases the response time and volumetric displacement required of the brake.

Yet another deficiency in prior art ball ramp brakes is the inability to use two different lubricating fluids within the housing of the brake without cross-contaminating both fluids. This inability is significant because various components of the brake assembly may perform more efficiently in the presence of different fluids. For instance, it is believed to be beneficial to use DOT-3 or DOT-4 brake fluid in a slave cylinder of the brake, while it is preferable to use a petroleum-based oil within the disc assembly. Prior art ball ramp brakes do not provide an effective means of using both fluids simultaneously by preventing mixing of the two fluids.

In view of these problems, it is evident that the need exists for a ball ramp brake providing improved cooling capabilities, an improved actuation system, and a method of separating fluid filled chambers so as to allow multiple fluids to be used.

DISCLOSURE OF THE INVENTION

It is thus an object of one aspect of the present invention to provide a ball ramp brake having both a quick response and a high mechanical advantage.

It is an object of another aspect of the present invention to provide a ball ramp brake, as above, having the ability to use different fluids within a slave cylinder and the interior of the brake without permitting mixing of the two fluids.

It is an object of an additional aspect of the present invention to provide a brake with improved fluid cooling capabilities thereby increasing the efficiency of the brake.

These and other objects of the present invention, as well as the advantages thereof over existing prior art forms, which will become apparent from the description to follow, are accomplished by the improvements hereinafter described and claimed.

In general, a ball ramp brake according to the objects of the present invention includes a housing and an actuator selectively rotatable about an axis to cause actuation of the brake. A plurality of depressions are oriented circumferentially in the actuator and become progressively shallower in a first circumferential direction. A plurality of circumferentially oriented depressions are provided in the housing adjacent to the actuator, which become progressively shallower in a second circumferential direction. The depressions in the actuator and in the housing each have a first angle of depression and a second angle of depression, with the first angle being greater than the second angle.

In accordance with at least one aspect of the present invention, a ball ramp brake includes a housing defining an inner chamber therein, and a rotating actuator within the inner chamber of the housing. A cylinder is provided and is adapted to be in fluid communication with a hydraulic actuating mechanism. The cylinder has a bore therein with an opening at one end, a piston slidably received within the bore to define a fluid chamber, and a pushrod engaged by the piston and extending through the opening to engage the rotating actuator. A seal is positioned around the pushrod and over the opening, the seal isolating the fluid chamber from the inner chamber of the housing.

In accordance with at least one aspect of the present invention, a ball ramp brake includes a housing, a disc assembly chamber defined by the housing, a cooling fluid within the disc assembly chamber, and a cooling chamber defined by the housing and in fluid communication with the disc assembly chamber. A disc assembly is positioned within the disc assembly chamber and includes a plurality of discs rotating about an axis of rotation. The disc assembly generates centrifugal forces when rotating, thereby causing the cooling fluid within the disc assembly chamber to flow through the cooling chamber.

A preferred exemplary ball ramp brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

A brake made in accordance with one aspect of the present invention is indicated generally by the numeral 10 and includes a housing 11 which contains and protects the working brake components in addition to providing means to mount brake 10 to a piece of equipment or a vehicle. Housing 11 is generally cup-shaped in section having a back portion 12 and a front portion 13.

Back portion 12 includes a back wall 14 which generally defines the base of back portion 12, and a side wall 16 extending from the outer periphery of back wall 12 and terminating in a mating surface 17. Back wall 14 has a central bore 18 located about an axis 20. Back wall 14 also includes a mounting bracket 22 attached thereto, with bolts 24 passing through mounting bracket 22 and into holes 26 located in back wall 14, thereby securing mounting bracket 22 to back wall 14. Mounting bracket 22 may be of any suitable shape or construction to facilitate mounting the brake 10 to particular vehicles or equipment as well as allowing attachment to housing 11, as will be appreciated by persons skilled in the art. The mounting bracket 22 shown includes two arms 28 and 30 extending from back wall 14 with each having a bore 32 passing therethrough to allow attachment, in this instance, to the vehicle's steering knuckles. Mounting bracket 22 also includes a flange 34 that is positioned concentrically within a lip 36 located at the opening of bore 18 in back wall 14. A back bearing 38 is positioned concentrically within flange 34 such that the outer race of back bearing 38 mates with an inner diameter of flange 34.

Figure 1:
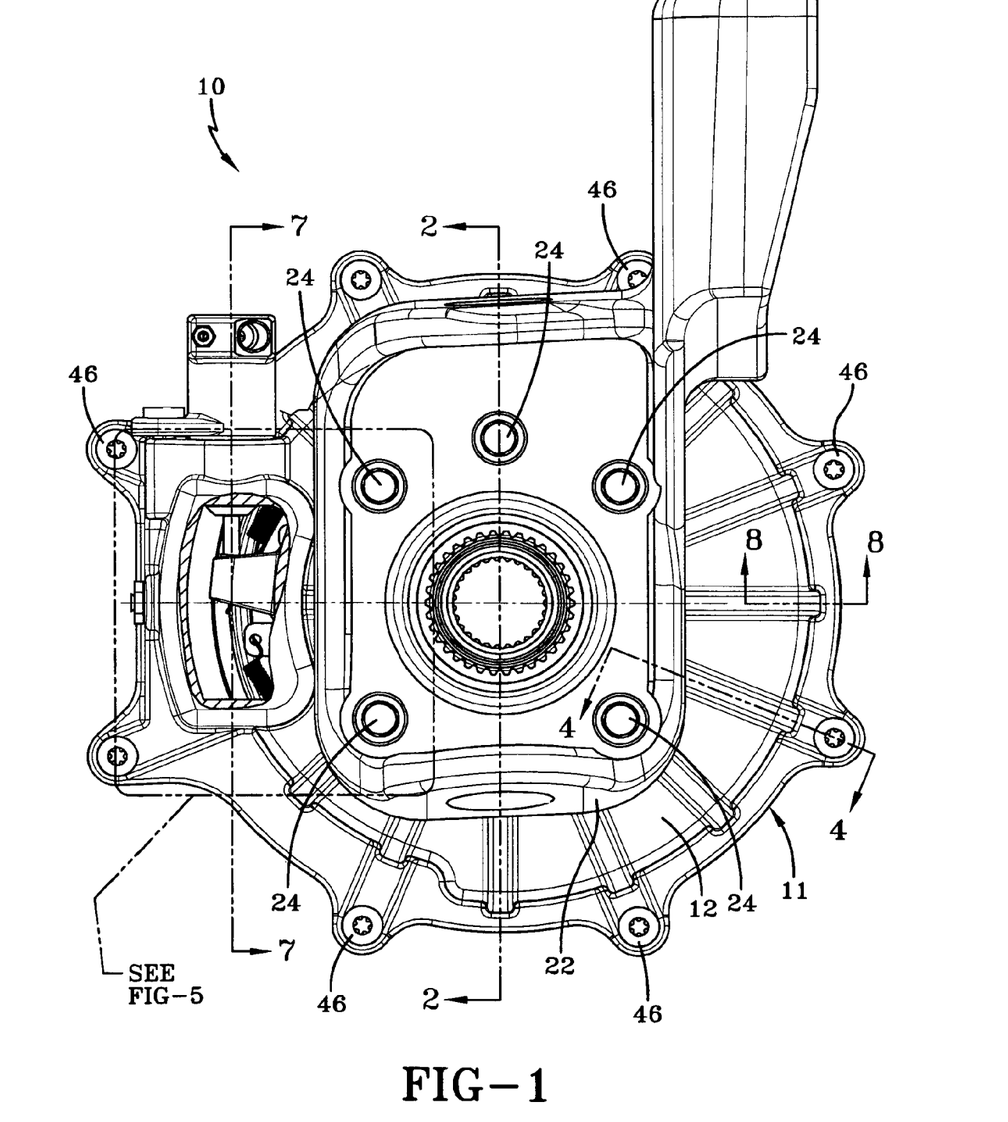
FIG. 1 is a side elevational view of a ball ramp brake according to the concepts of the present invention.
Figure 2:
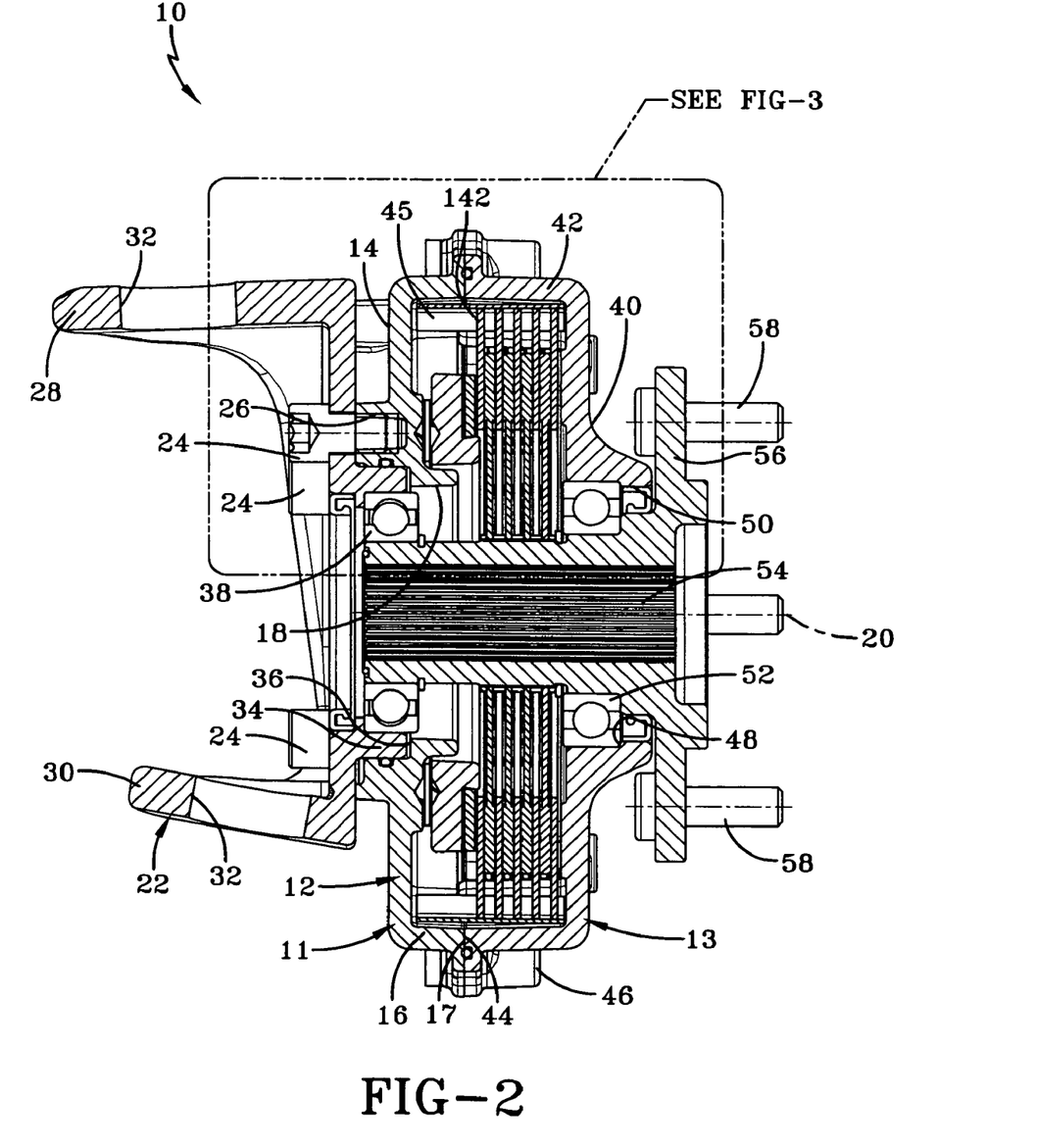
FIG. 2 is a sectional view of the ball ramp brake taken substantially along line 2-2 of FIG. 1.

As is best shown in FIG. 2, front portion 13 of housing 11 includes a front wall 40 which generally defines the base of front portion 13, and a side wall 42 extending from the periphery of front wall 40 and terminating at a mating surface 44. Mating surfaces 17 and 44 engage one another to form an enclosed inner chamber 45 within housing 11, defined by back portion 12 and front portion 13. A plurality of fasteners 46 are used to secure front portion 13 to back portion 12. A lip 48 extends axially from front wall 40 around a bore 50 that passes through front wall 40 and is centered on axis 20. A front bearing 52 is positioned concentrically within bore 50 of front wall 40 such that the outer race of front bearing 52 mates with front wall 40. A splined shaft 54 is rotatably positioned within the inner races of back bearing 38, and front bearing 52 and is centered on axis 20. Shaft 54 includes a wheel mounting plate 56 formed integrally therewith and protruding from within bore 50 adjacent front wall 40. Wheel mounting plate 56 includes a plurality of fasteners 58 for securing a wheel thereto.

Figure 3:
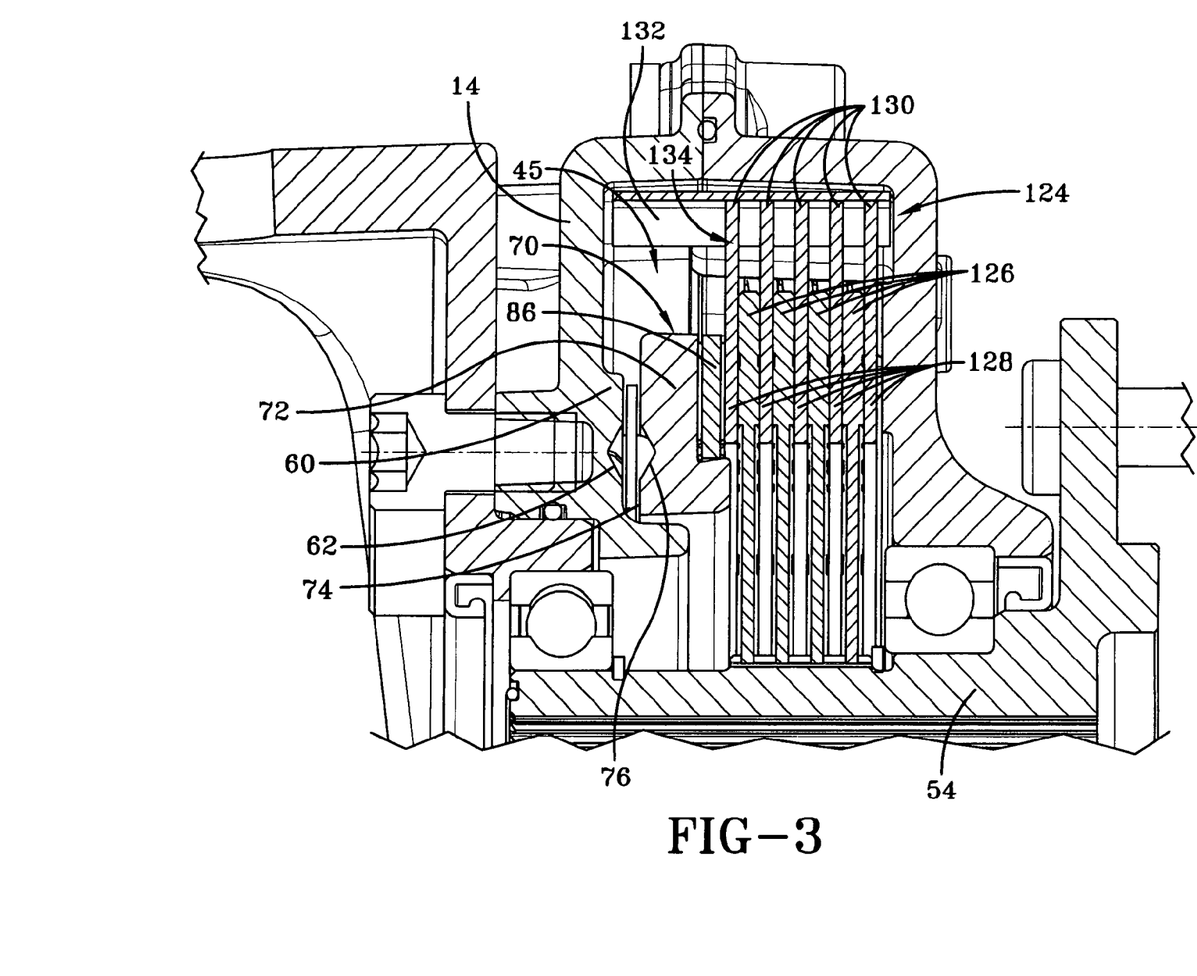
FIG. 3 is an enlarged sectional view of a portion of the ball ramp brake depicted in FIG. 2.
Figure 10A:
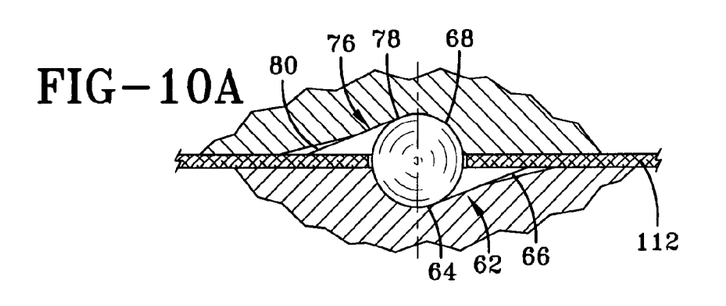
FIG. 10A is a sectional view of the two stage ball-ramp actuator according to the concepts of the present invention in an un-actuated state.
Figure 11A:
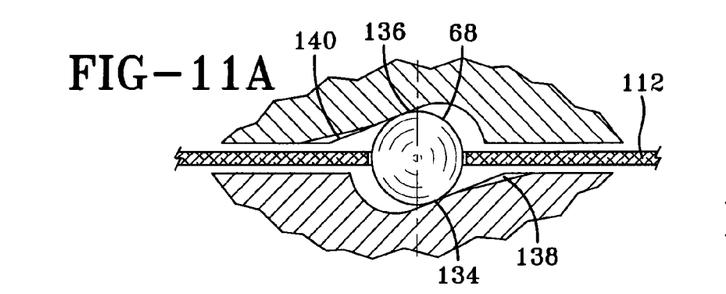
FIG. 11A is a sectional view of the two stage ball-ramp actuator according to the concepts of the present invention in a partially actuated state.
Figure 11B:
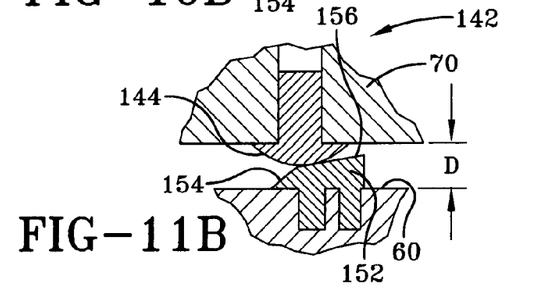
FIG. 11B is a sectional view of the button and ramp assembly of the present invention in a partially actuated state.
Figure 12A:
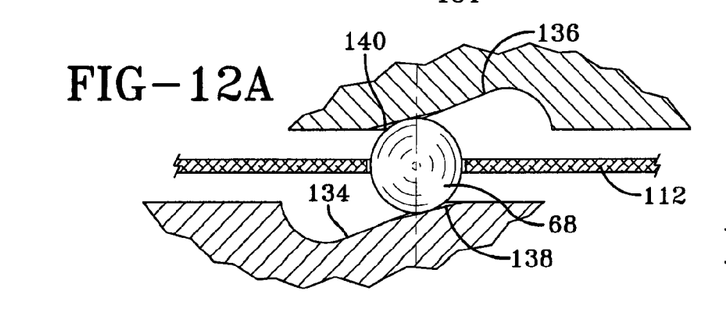
FIG. 12A is a sectional view of the two stage ball ramp actuator according to the concepts of the present invention in a completely actuated state.

With reference now to FIG. 3, which shows an enlarged view of a portion of FIG. 2, it can be seen that inner chamber 45 is provided with a stationary actuator surface 60 (hereinafter stationary surface 60) which extends axially inwardly from back wall 14 into chamber 45. Stationary surface 60 is provided with a plurality of depressions 62. In the present embodiment, eight depressions 62 are included and are disposed in a spaced circumferential pattern about axis 20, however, it should be appreciated that more or less than eight depressions may be employed. As best seen in FIGS. 10A, 11A, and 12A, each depression 62 includes a head portion 64 and a tapered tail portion 66 projecting circumferentially therefrom. Depressions 62 are deepest at the head portion 64 and become relatively more shallow along tail portion 66. Each depression 62 is adapted to receive a ball 68 therein. It is preferred that depressions 62 provide a gradual reduction in depth from head portion 64 to tail portion 66. This reduction in depth also corresponds to the direction of travel of ball 68, as will be hereinafter described.

Chamber 45 also receives a rotatable actuator 70 therein, as seen in FIG. 3. As will become evident, actuator 70 is rotatable about axis 20 and, upon such rotation, activates brake 10. Rotatable actuator 70 includes a generally annular body portion 72 centered around axis 20. Body portion 72 provides a rotatable actuator surface 74 (hereinafter rotatable surface 74) which is adjacent to and faces stationary surface 60. Rotatable surface 74 is generally disc-shaped and is provided with a plurality of depressions 76. As can be seen in FIG. 3, depressions 76 of rotatable actuator 70 are oriented to align with depressions 62 in stationary surface 60. Thus, in the present embodiment, eight depressions 76 are included, each having a head portion 78 and a tapered tail portion 80 projecting circumferentially therefrom, as in stationary surface depressions 62. Like depressions 62 of stationary surface 60, the rotatable surface depressions 76 are deepest at the head portion and become relatively shallower along tail portion 80. Further, depressions 76 are spaced radially the same distance from axis 20 as depressions 62 Stationary surface depressions 62 and rotatable surface depressions 76 will be discussed in greater detail hereinafter.

Figure 5:
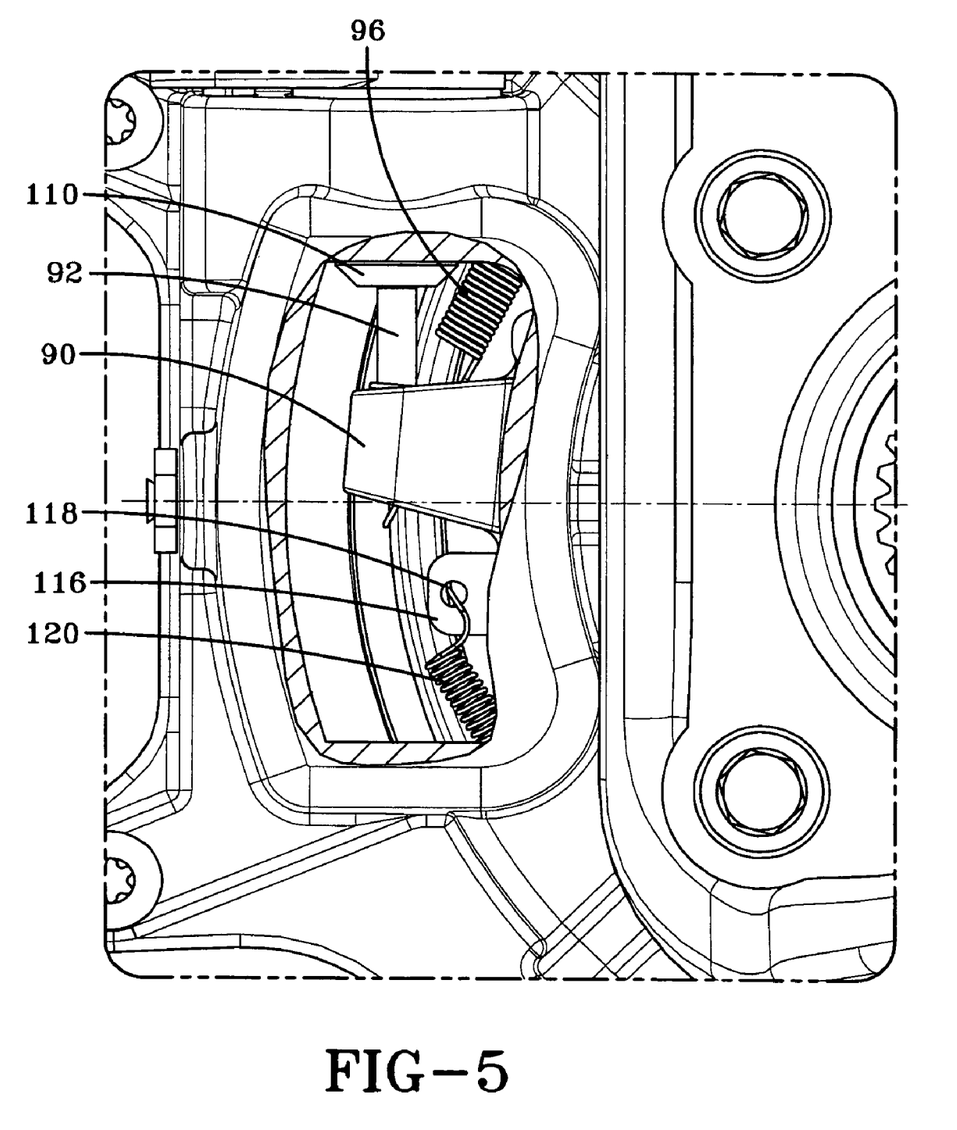
FIG. 5 is an enlarged side view of a portion of the ball ramp brake depicted in FIG. 1.
Figure 6:
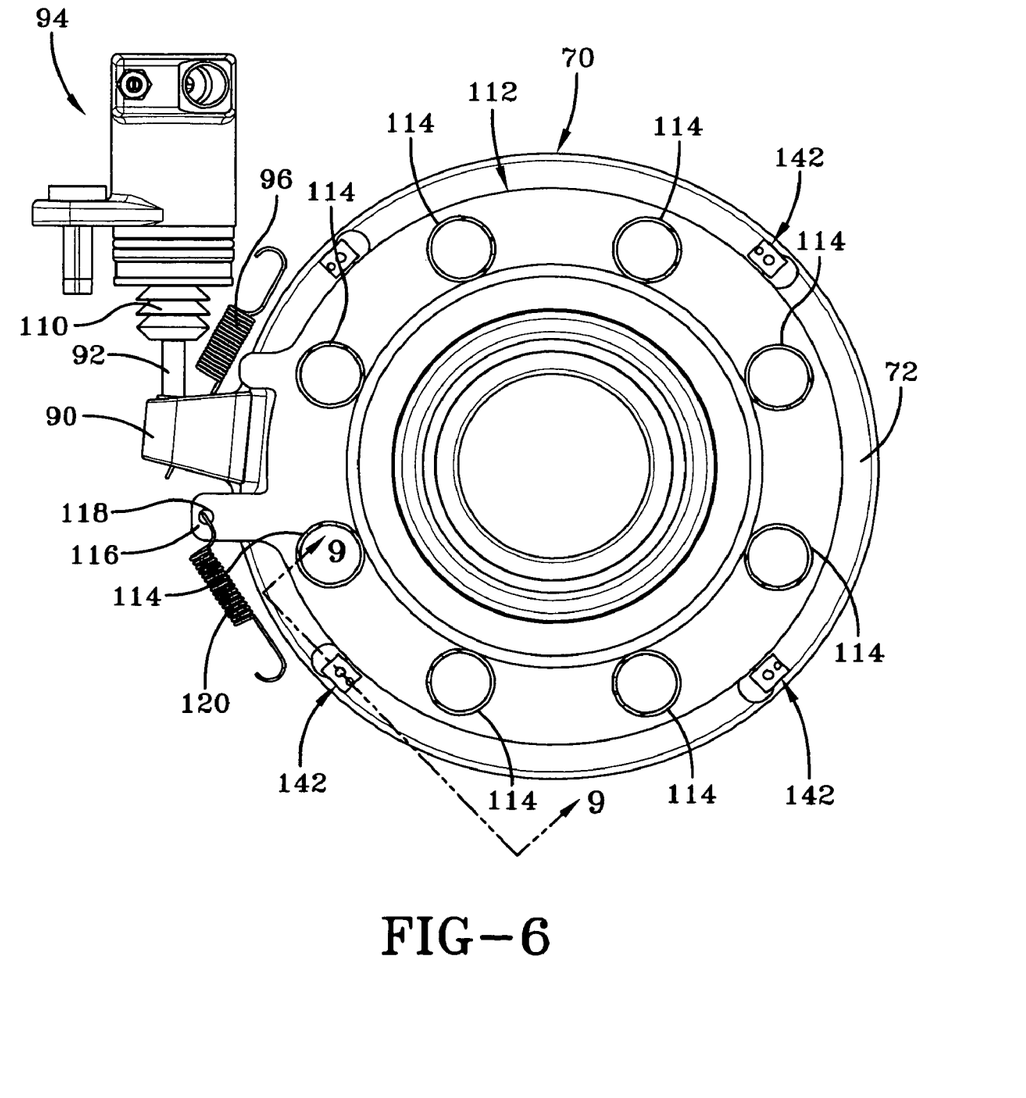
FIG. 6 is a side elevational view of a ball cage and actuator assembly according to the concepts of the present invention.

Rotatable actuator 70 further includes a bearing surface 82 (FIG. 4) which faces away from back wall 14 and which is adapted to contact a roller bearing assembly 84. Roller bearing assembly 84 is annular and includes a frame (not shown) which carries a plurality of radially oriented cylindrical bearings 86. A lip 88 is provided on the inner radial edge of bearing surface 82 which radially locates roller bearing assembly 84 on rotatable actuator 70. Rotatable actuator 70 is further provided with an actuator arm 90 which projects radially from body 72, as best seen in FIGS. 5 and 6. Actuator arm 90 is provided with a depression, in which rests a pushrod 92 projecting from a slave cylinder 94. An expansion spring 96 is also attached to actuator arm 90, with the opposing end of expansion spring 96 being attached to a stationary point on housing 11. Expansion spring 96 serves to maintain contact between pushrod 92 and actuator arm 90, as well as assisting in returning rotatable actuator 70 to an unactuated position upon release of a braking force, as will be hereinafter described.

Figure 7:
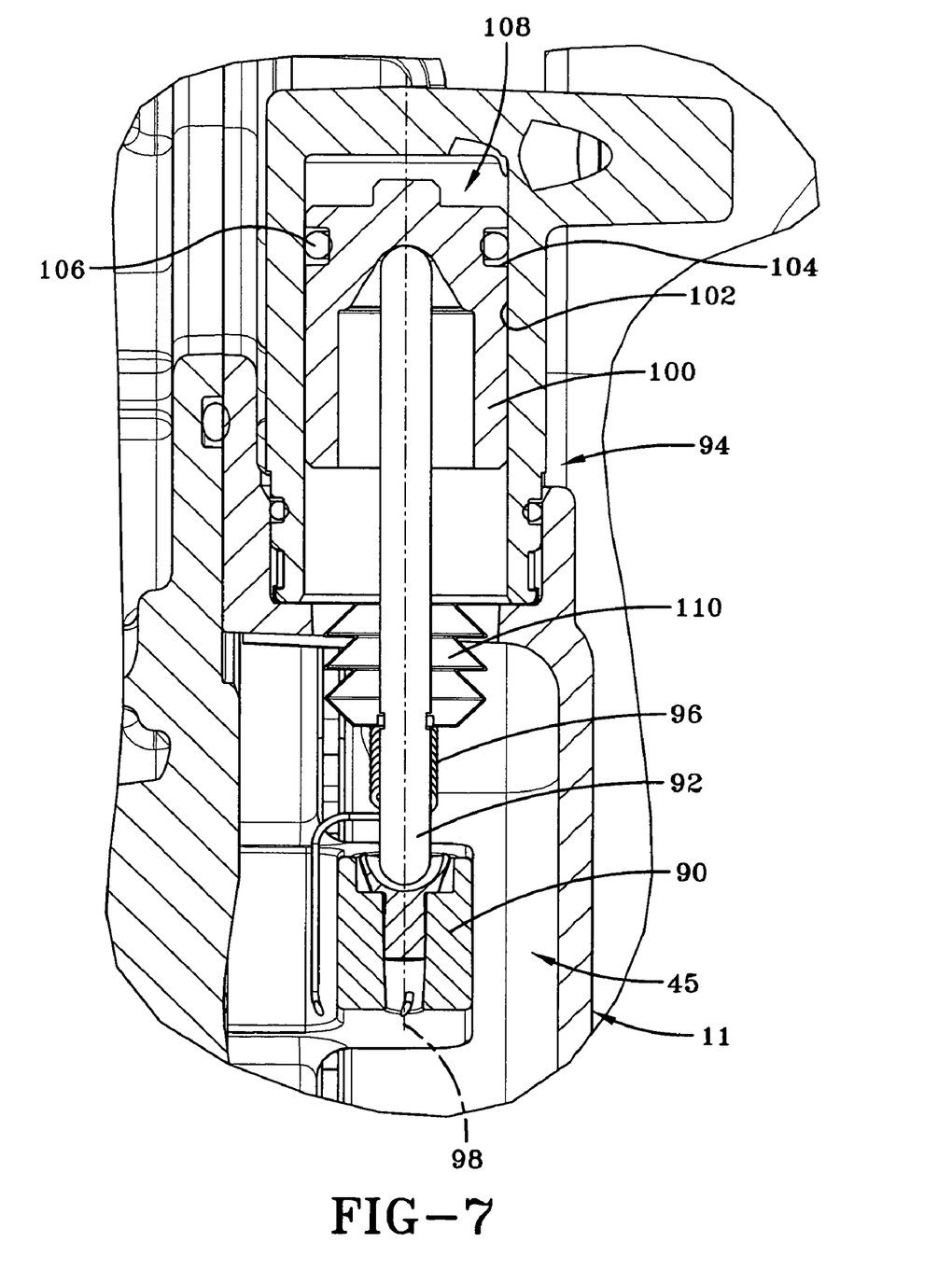
FIG. 7 is a fragmentary sectional view of the ball ramp brake taken substantially along line 7-7 of FIG. 1 showing a slave cylinder and a boot seal.

With reference now to FIG. 7, the slave cylinder 94 is shown in detail. When slave cylinder 94 is hydraulically actuated, pushrod 92 is moved axially along axis 98 to actuate rotatable actuator 70 via actuator arm 90. Hydraulic actuation of slave cylinder 94 is achieved by a known hydraulic mechanism, as will be appreciated by those skilled in the art. A piston 100 is received in a bore 102 within slave cylinder 94. Piston 100 receives pushrod 92 therein and is axially engaged therewith so that axial movement of piston 100 causes axial movement of pushrod 102. An annular recess 104 is provided in piston 100, and an annular seal 106 is positioned therein. Annular seal 106 is in contact with bore 102 to create a seal between piston 100 and bore 102. A fluid chamber 108 is defined by bore 102 and piston 100 opposite pushrod 92, and is in fluid communication with a hydraulic fluid source. As will be appreciated by those skilled in the art, actuation of a hydraulic mechanism causes hydraulic fluid to fill chamber 108 thereby causing axial movement of piston 100 and pushrod 92 toward actuator arm 90. When hydraulic pressure is released, piston 100 and pushrod 92 return to their unactuated position, assisted by expansion spring 96.

While an annular seal 106 is provided within slave cylinder 94 to prevent fluid leakage, such seals are not always entirely effective in such high pressure environments. Slave cylinder 94 is therefore provided with a boot seal 110 that further separates an internal fluid chamber 108 of slave cylinder 94 from inner chamber 45 of housing 11. Boot seal 110 is made of a flexible material that provides a reliable seal while simultaneously allowing axial motion of pushrod 92. The presence of the sealing effect of boot seal 110 permits two different fluids to be used, one in fluid chamber 108 of slave cylinder 94, and another in inner chamber 45 of housing 11. This is advantageous in that it allows DOT-3 or DOT-4 fluids, which are incompatible with most rubber materials, to be used within slave cylinder 94, while allowing a petroleum based fluid to be used within inner chamber 45. The flexible material used to make boot seal 110 is preferably impervious to corrosion caused by both fluids used.

Figure 4:
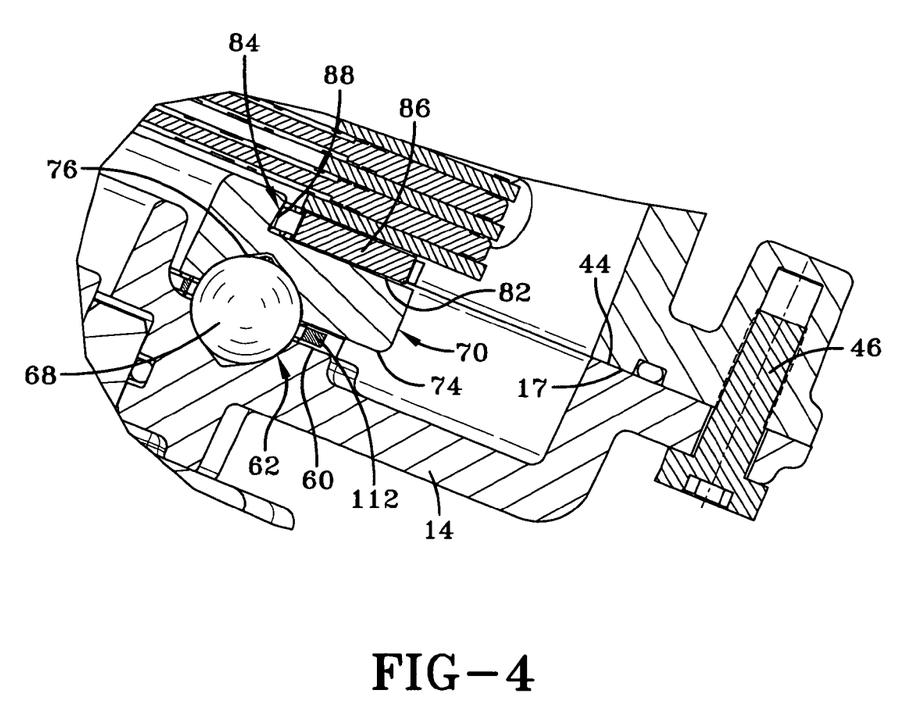
FIG. 4 is a sectional view of the ball ramp brake taken substantially along line 4-4 of FIG. 1 showing a ball within and between depressions in the actuator and the housing.

With reference to FIGS. 4 and 6, chamber 45 also contains a ball cage 112 positioned between rotatable actuator 70 and stationary surface 60. Ball cage 112 is rotatable about axis 20 and contains a plurality of holes 114 spaced circumferentially around axis 20. As can be seen in FIG. 6, ball cage 112 contains eight holes 114 that correspond to and fit over the eight balls 68 positioned between depressions 62 and 76. Ball cage 112 further includes an arm 116 with an eyelet 118 that receives an end of an expansion spring 120. Expansion spring 120 is attached at its opposite end to a stationary point within chamber 45 and applies a rotational force to ball cage 112 that acts to keep balls 68 in contact with depressions 62 and 76, as will be hereinafter described.

Brake 10 further includes a disc assembly generally indicated by the numeral 124, as best seen in FIG. 3, which includes a plurality of conventional rotatable discs 126 and a plurality of conventional stationary discs 128, as are well known in the art. Rotatable discs 126 and stationary discs 128 are positioned in an axially alternating manner. In the present embodiment four rotatable and five stationary discs are shown, but it should be appreciated that any number may be used. Rotatable discs 126 are provided with an inner surface which is splined to engage the matching splines of splined drive shaft 54. In this manner, as the drive shaft rotates, rotatable discs 126 rotate therewith. Rotatable discs 126 are rotationally coupled to the shaft but are free to slide axially thereon. Drive shaft 54 may be operatively coupled to any working mechanism. For example, drive shaft 54 may be operatively coupled to the axle of a vehicle. Thus, when a braking torque is applied to drive shaft 54, it is consequently applied to the axle, thereby slowing the vehicle or other device.

Stationary discs 128 have an inner surface which fits over, but is not engage by, splined drive shaft 54. Stationary discs 128 are provided with diametrically opposed ears 130 that extend radially outwardly therefrom, as is well known in the art. In the embodiment disclosed, one pair of ears is provided, but it should be appreciated that any number of pairs may be employed. Each ear 130 is adapted to slidingly receive a bracket 132 therein. Brackets 132 are each received in one of a plurality of U-shaped pockets (not shown) located in housing 11. The opposed end of each bracket 132 is received in a corresponding pocket (not shown) in housing 11. In this manner, brackets 132 are secured between front portion 13 and back portion 14. Likewise, stationary discs 128 are thus engaged with housing 11 via brackets 132, and are thereby prevented from rotating. Stationary discs 128 are, however, free to slide axially along brackets 132 between cylindrical bearings 86 and front wall 40. Therefore, when an axial force is applied to one end of disc assembly 124, the discs are caused to slide axially and in turn the discs are caused to engage each other. When the discs engage each other, a braking torque is applied to drive shaft 54 due to the friction created between rotatable discs 126 and stationary discs 128, which are prevented from rotating by brackets 132. As discussed above, cylindrical bearings 86 are interposed between disc assembly 124 and rotatable actuator 70 and thus transfer only axial forces therebetween, without transferring significant rotational torque.

Figure 8:
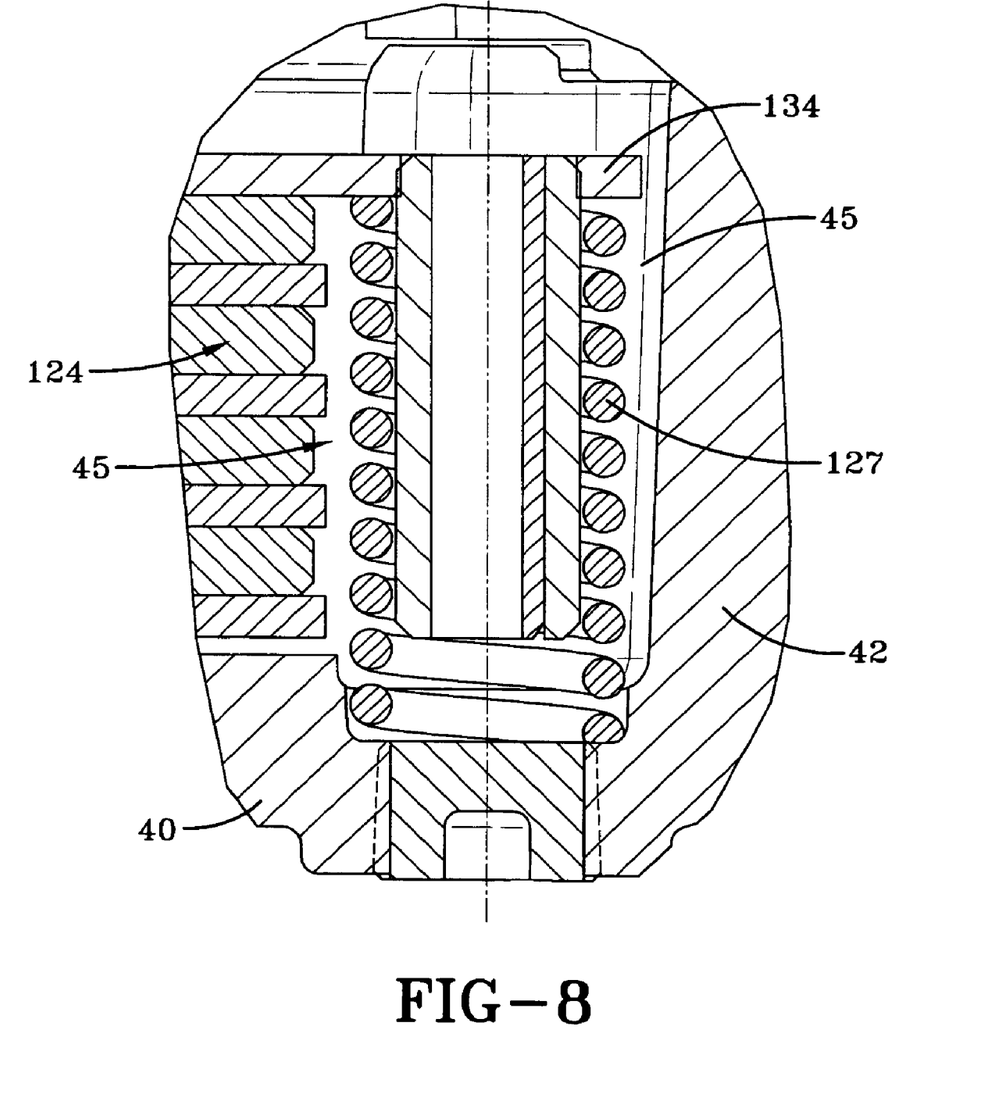
FIG. 8 is a fragmentary sectional view of a biasing spring taken substantially along line 8-8 of FIG. 1.

A plurality of springs 127, seen in FIG. 8, are provided around the periphery of inner chamber 45 that act to bias disc assembly 124 and rotatable actuator 70 in an unactuated position. Springs 127 are positioned between housing 11 and a primary stationary disc 134 and, therefore, will act to return primary stationary disc 134 to its unactuated position upon removal of a braking force.

As can be best seen in FIGS. 10A, 11A, and 12A, each depression 76 is adapted to receive ball 68 therein. In such a manner, each ball 68 is secured between adjacent or facing depressions 62 and 76. Further, when assembled, tail portion 66 of depression 62 faces in the opposed circumferential direction from tail portion 80 of depression 76. Thus, as will become apparent, when rotatable actuator 70 is rotated about axis 20, balls 68 roll along the depressions 62 and 76 from head portions 64 and 78 toward tail portions 66 and 80, thereby moving to an area of gradually decreasing depth and consequently forcing rotatable actuator 70 axially away from end wall 14.

Depressions 62 and 76 each have two stages of actuation, the two stages caused by a first stage ramp angle 134 of stationary surface depressions 62, a first stage ramp angle 136 of rotating surface depressions 76, a second stage ramp angle 138 of stationary surface depressions 62, and a second stage ramp angle 140 of rotating surface depressions 76 (FIGS. 11A and 12A). First stage ramp angles 134, 136 are steeper than second stage ramp angles 138, 140 and, consequently, cause a more rapid axial movement of rotatable actuator 70 in a direction away from stationary surface 60. Upon reaching the shallower second stage ramp angles 138, 140 the speed of axial movement of rotatable actuator 70 will decrease, while the mechanical advantage generated will increase. The first stage and second stage ramp angles may be adjusted to achieve the desired response time and volumetric displacement of brake 10, and the desired braking forces generated by rotatable actuator 70, but first stage ramp angles 134, 136 will be steeper in each case than second stage ramp angles 138, 140.

Figure 9:
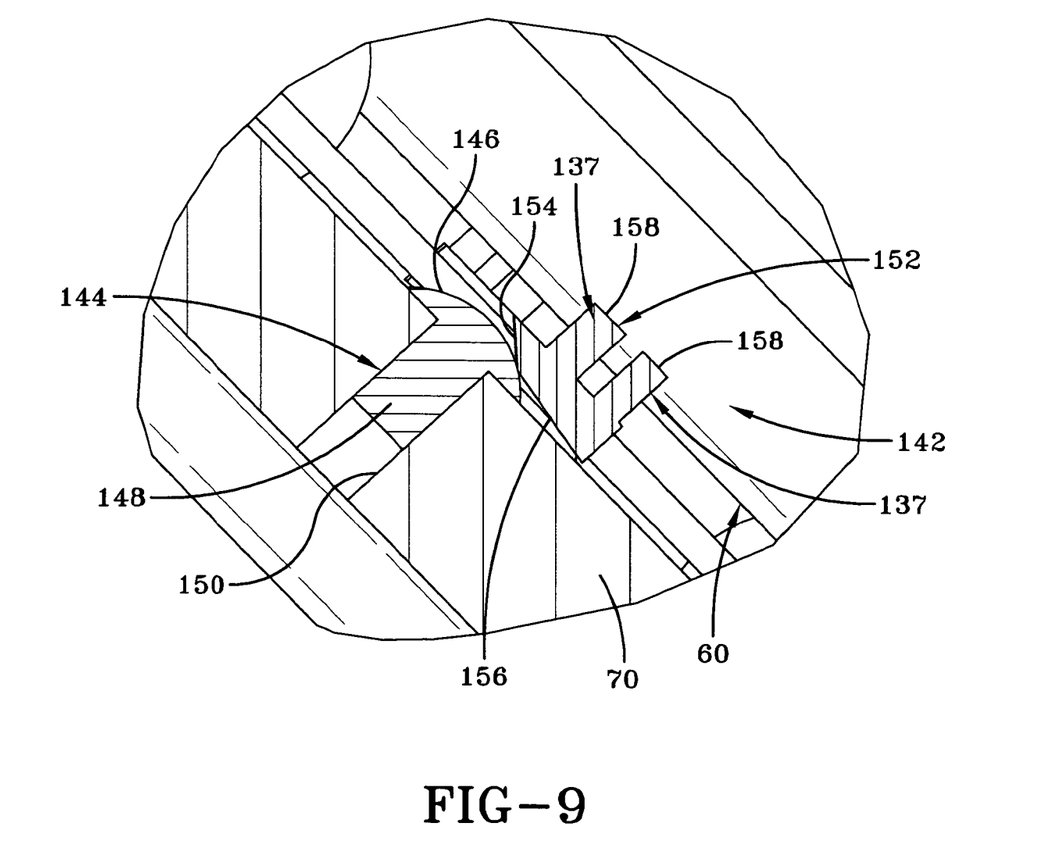
FIG. 9 is an enlarged fragmentary sectional view of the button-ramp assembly taken substantially along line 9-9 of FIG. 6.

In addition to balls 68 and depressions 62 and 76, which act to provide axial movement of rotatable actuator 70, brake 10 is also provided with a button and ramp assembly generally indicated by the numeral 142 and best seen in FIG. 9. Button and ramp assembly 142 assists the ball-ramp system in actuating the rotatable actuator and includes a button 144 having a generally spherical top surface 146 and a stem 148, the stem being positioned within a hole 150 in rotatable actuator 70 such that only spherical top surface 146 is exposed. While a generally spherical button is shown and described in the embodiment shown, it should be appreciated that the button may be provided in alternate shapes, such as, for example, a generally conically shaped button. Button and ramp assembly 142 also includes a ramp 152 having a first angled surface 154, a second angled surface 156, and two protrusions 158. Protrusions 158 fit into holes in stationary surface 60 such that only the angled portions 154 and 156 of ramp 152 are exposed.

Figure 10B:
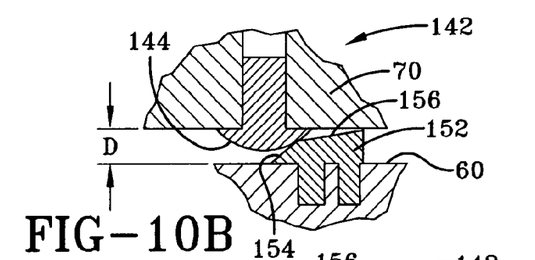
FIG. 10B is a sectional view of the button and ramp assembly of the present invention in an un-actuated state.

As is apparent from the drawings, first angled surface 154 is steeper than second angled surface 156, and first angled surface 154 is adjacent button 144 when brake 10 is unactuated (FIG. 10B). When rotational actuator 70 is rotated, spherical top surface 146 of button 144 is caused to travel up ramp 152. The varying angles of ramp 152 cause varying speeds of axial movement of rotational actuator 70, as well as creating varying degrees of mechanical advantage, with second angled surface 156 creating a greater mechanical advantage than first angled surface 154. The varying angles are also designed to assist balls 68 in depressions 62 and 76 at positions in which balls 68 are acting against higher resistance by the disc assembly.

In an unactuated state, as shown in FIGS. 10A and 10B, no external forces are being applied to brake 10. In such a case, springs 96 and 127 bias rotatable actuator 70 axially toward back wall 14. Because no other forces are present, rotatable actuator 70 will orient itself such that balls 68 reside in head portions 64 and 78 of the respective depressions 62 and 76, as seen in FIG. 10A. Thus, in the unactuated state, balls 68 reside in the deepest portions of the depressions and therefore rotatable actuator 70 is positioned at the shortest relative distance from end wall 14 so that rotatable discs 126 can rotate freely between stationary discs 128. In this unactuated state, button and ramp assembly 142 is positioned with rotatable actuator 70 resting on the uppermost surface of ramp 152, as shown in FIG. 10B. A gap D exists between rotatable actuator 70 and stationary surface 60 at the radial position of button and ramp assembly 152.

Figure 12B:
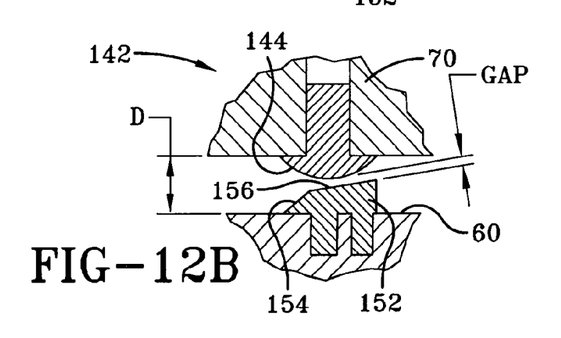
FIG. 12B is a sectional view of the button and ramp assembly of the present invention in a completely actuated state.
Figure 13:
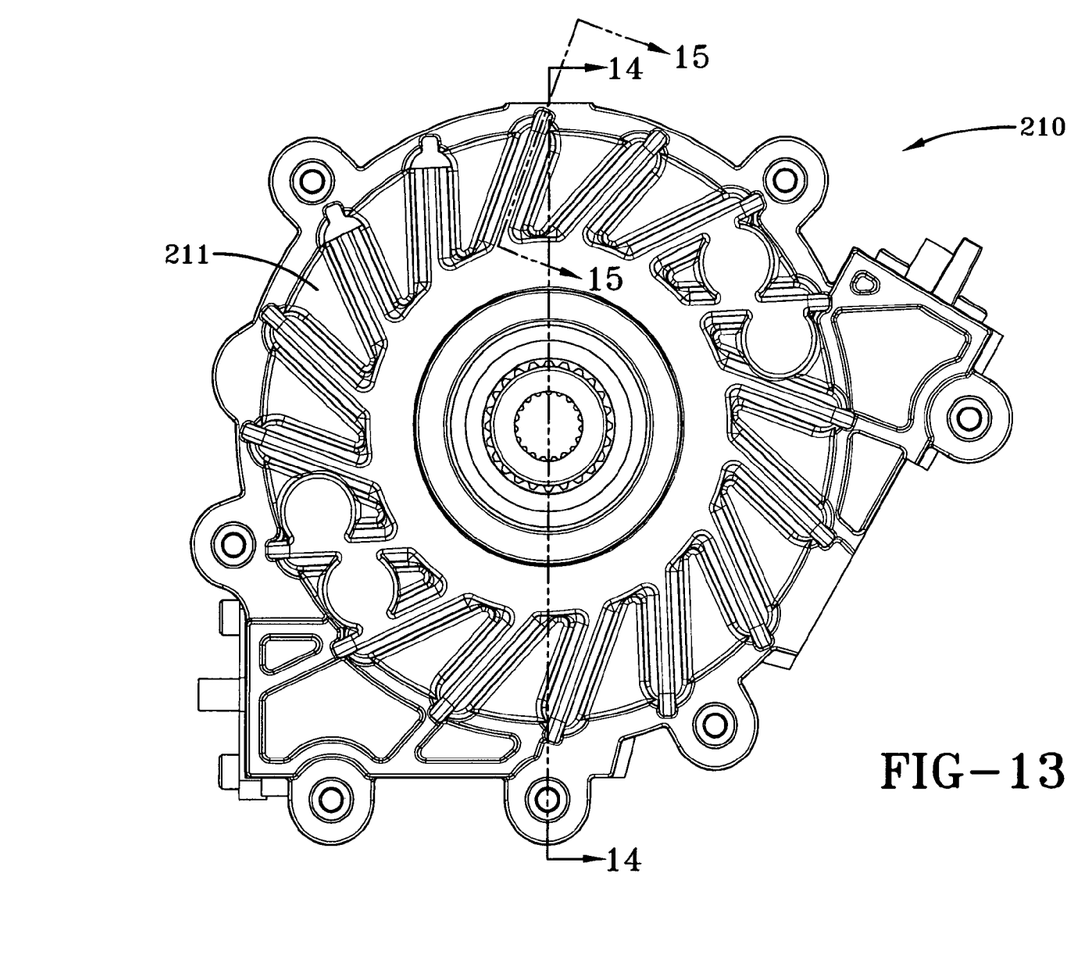
FIG. 13 is a side elevational view of another embodiment of a ball ramp brake according to the concepts of the present invention.
Figure 14:
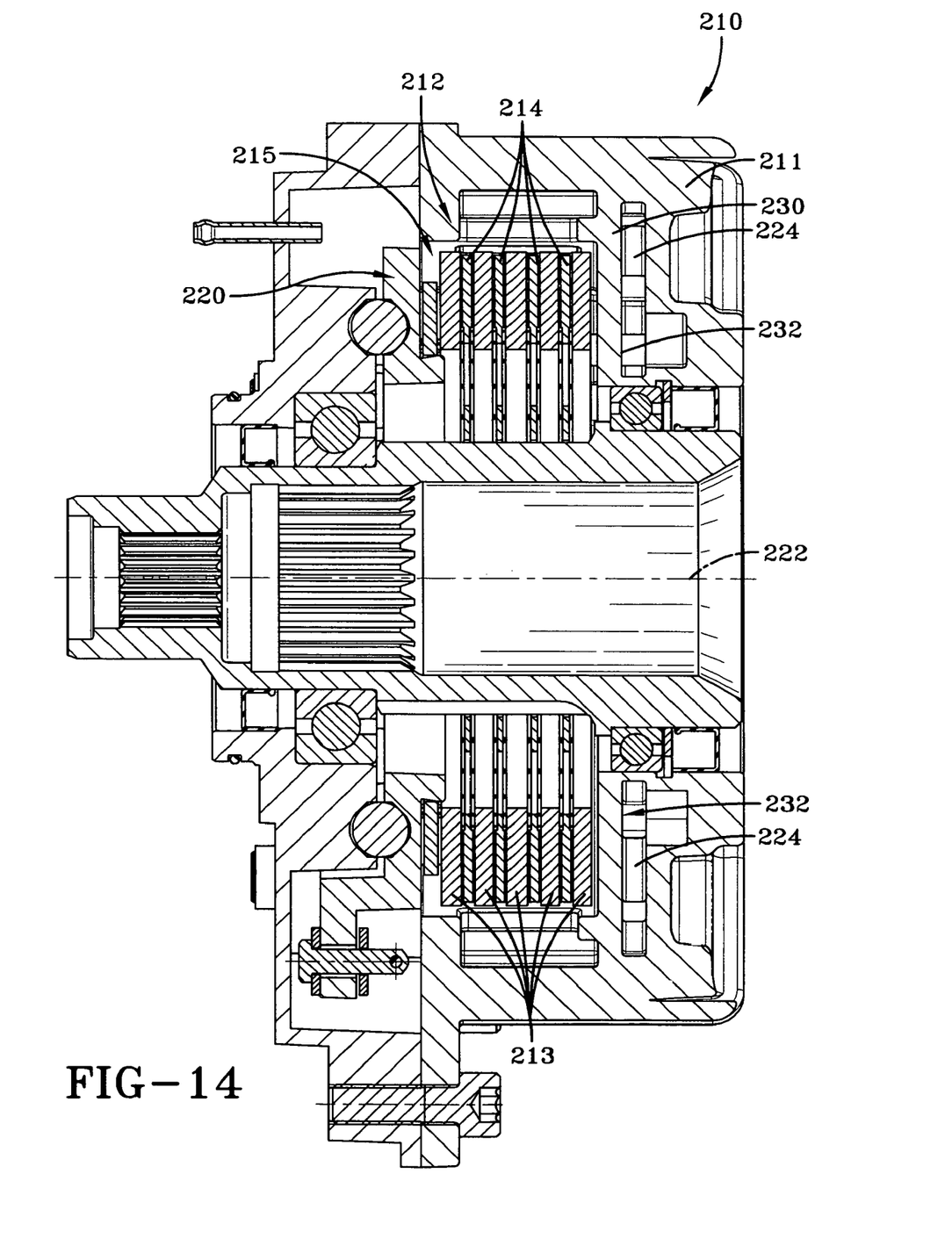
FIG. 14 is a sectional view of the ball ramp brake taken substantially along line 14-14 of FIG. 13.

Brake 10 may be selectively actuated, thereby applying a braking torque to the shaft. Actuation is accomplished by applying a generally tangential force on actuator arm 90, which is generated by pushrod 92 of slave cylinder 94. The pushing force on actuator arm 90 causes rotatable actuator 70 to rotate around axis 20, which in turn causes depressions 76 of rotatable actuator 70 to move relative to depressions 62 of stationary surface 60, and also causes buttons 144 to move relative to ramps 152. The first angled surface 154 of ramp 152, which is relatively steep, causes axial movement of rotatable actuator 70 more quickly than balls 68 in depressions 62 and 76 would cause alone. Ball cage 112, which is biased by spring 120, applies a force on balls 68 to keep them in contact with depressions 62 and 76, as seen in FIG. 11A. Otherwise balls 68 might remain seated in heads 64 or 78 due to the gap created by the quick axial movement of rotatable actuator 70 from the button and ramp assembly 142. As such, each ball 68 rolls along tail portions 66 and 80 to progressively shallower portions of the respective depressions. The angle of second angled surface 156 of ramp 152 is slightly less than that of depressions 62 and 76 so that balls 68 and ramps 152 cause approximately equivalent axial movement of rotatable actuator 70 after button 144 has reached second angled surface 156. Such movement gradually forces rotatable actuator 70 axially away from end wall 14 of housing 11. As seen in FIGS. 12A and 12B, balls 68 continue along depressions 62 and 76 to a fully actuated position, and at this fully actuated position balls 68 and depressions 62, 76 cause a gap between buttons 144 and ramp 152.

The axial force generated as described above is transferred to the disc assembly 124 via cylindrical bearings 86. Because cylindrical bearings 86 are free to rotate, only axial force is transmitted, and therefore almost no rotational frictional forces are transferred to disc assembly 124. The axial force applied to disc assembly 124 causes both the stationary discs 128 and rotational discs 126 to slide and compress toward front wall 40 of housing 11. When the discs engage each other, a braking torque is applied to the drive shaft 54 due to the friction created between rotatable discs 126 and stationary discs 128, which are prevented from rotating by brackets 132. When the force is released, springs 96 and 127 force rotatable actuator 70 axially toward back wall 14. In doing so, rotatable actuator 70 will rotate and return its unactuated state. The unactuated state is achieved when balls 68 again rest in the deepest portions of depressions 64 and 78 as shown in FIG. 10A.

The dual stage ramp assembly as described above provides several advantages over conventional designs using only a single ramp angle for ball ramp actuation. The button ramp assembly 142, as well as the first stage angles 134 and 136 of depressions 62 and 76, both allow for quick actuation of disc assembly 124 due to the steep initial angle of actuation. This reduces delay between user initiated actuation of brake 10 via slave cylinder 94 and the resulting braking force generated by disc assembly 124, while also reducing the amount of rotational movement required to generate braking forces. Consequently the amount of movement required of pushrod 92 and slave cylinder 94 is reduced, thereby requiring less fluid displacement to actuate the brake. Additionally, the shallower second angles 138, 140 provide superior mechanical advantage to brake 10 than would steeper angles. Thus, performance is enhanced in the sense that responsiveness is improved, without negatively effecting the mechanical advantage generated by the rotatable actuator.

Figure 15:
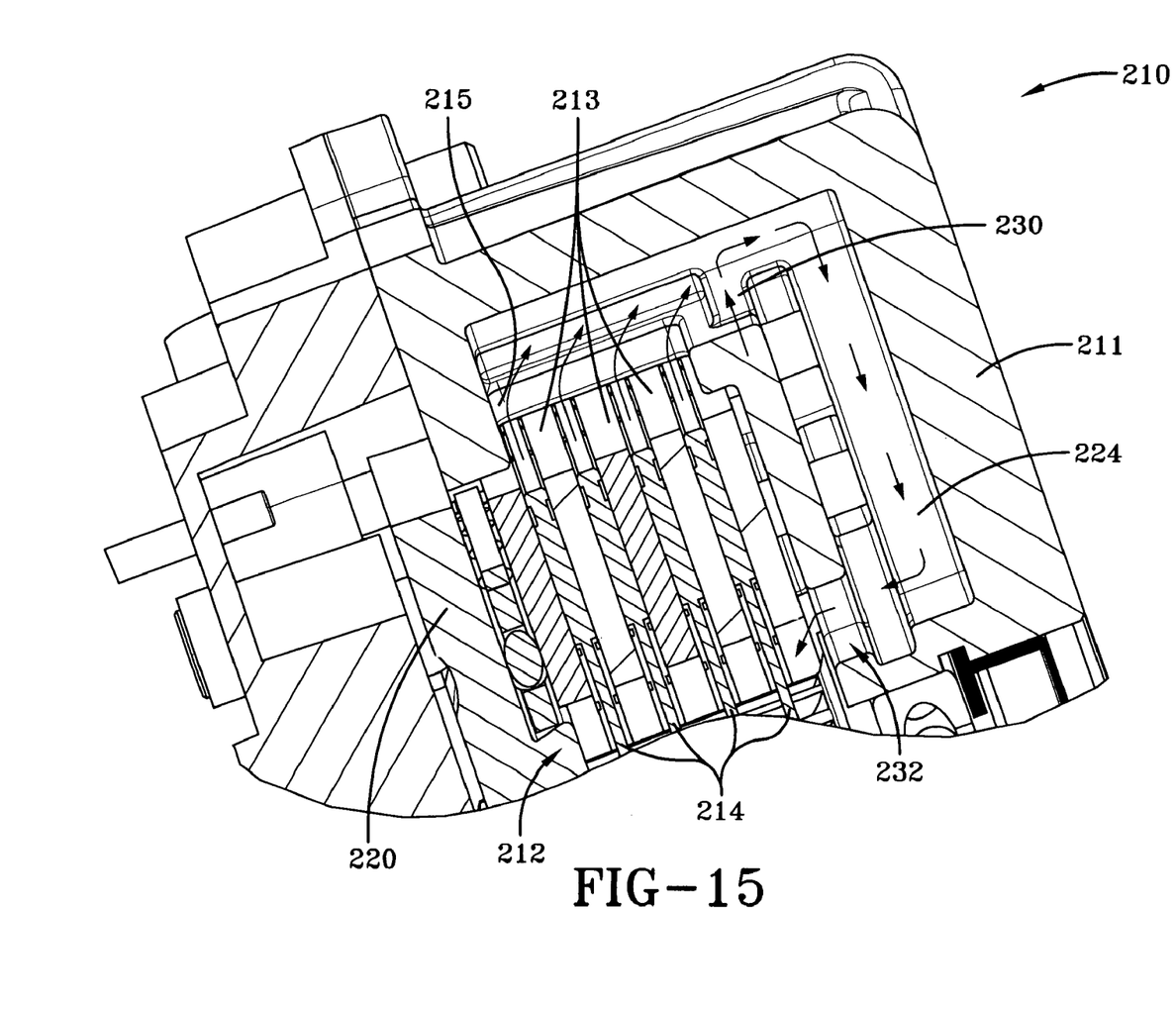
FIG. 15 is a fragmentary sectional view taken substantially along line 15-15 of FIG. 13 showing a cooling chamber according to the concepts of the present invention.

Another embodiment of the invention is shown in FIGS. 13-16. There a ball ramp brake generally indicated by the numeral 210 is shown and is similar in most respects to brake 10 described herein. Brake 210, like brake 10, thus includes a housing 211, a disc assembly 212 having stationary discs 213 and rotating discs 214. Brake 210 further includes a ball ramp actuator including a rotatable actuator 220, as described above. Housing 211 of brake 210 includes a cooling chamber 224 positioned between a disc assembly chamber 215 and housing 211 opposite rotatable actuator 220. Cooling chamber 224 is annular in shape, is positioned around an axis 222, and is in fluid communication with disc assembly chamber 215 at a cooling chamber inlet 230 and a cooling chamber outlet 232 (FIG. 15). Cooling chamber inlet 230 is located at the periphery of disc assembly 212, and cooling chamber outlet 232 is located radially closer to axis 222. Cooling chamber 224 may also include convection ribs (not shown) projecting from housing 211 into cooling chamber 224 as is well known in the art of cooling chambers. The ribs provide additional surface area at which heat transfer may occur between the fluid and housing 211.

Fluid within disc assembly chamber 215 is forced toward the periphery of the chamber due to the rotation of rotating discs 214. This fluid then flows through cooling chamber inlet 230, through cooling chamber 224, and back into disc assembly chamber 215 through cooling chamber outlet 232. In this way the fluid absorbs heat generated by the disc assembly 212 while in the disc assembly chamber 215, and then releases the heat as it travels through cooling chamber 224 in a continuous cycle. When a braking force is applied by rotatable actuator 220, the rotating discs 214 will cease rotation and, consequently, the circular flow through cooling chamber 224 will cease, causing the fluid to flood disc assembly chamber 215. When the braking force is released and rotational discs 214 commence rotation, the flow through cooling chamber 224 will begin again. Thus, the fluid is cooled, thereby increasing efficiency without effecting the braking forces generated by brake 210.

It is thus evident that a ball ramp brake constructed as described herein accomplishes the objects of the present invention and otherwise substantially improves the art.

What is claimed is:

1. A ball ramp brake comprising a housing, an actuator selectively rotatable about an axis to cause actuation of the brake, a plurality of depressions oriented circumferentially in said actuator and becoming progressively shallower in a first circumferential direction, a plurality of circumferentially oriented depressions in said housing adjacent to said actuator, said housing depressions becoming progressively shallower in a second circumferential direction, said depressions in said actuator and in said housing each having a first angle of depression and a second angle of depression, said first angle being greater than said second angle, and a button and ramp assembly including a plurality of buttons secured in said actuator, and a plurality of ramps carried by said housing, said buttons and said ramps being circumferentially and radially aligned so as to engage one another, each of said ramps including a first angled surface and a second angled surface, said first angled surface having a steeper angle than said second angled surface, said button being in contact with said first angled surface of said ramp and said housing being in contact with said second angled surface of said ramp when said actuator is in an unactuated position, wherein said balls and said depressions in said actuator and in said housing create a gap between said button and said ramp when said actuator is in a fully actuated position.

2. The ball ramp brake of claim 1, said depressions in said actuator and in said housing each having a head, said head being the point of greatest depression, each of said heads in said housing depressions being circumferentially aligned with one of said heads in said actuator.

3. The ball ramp brake of claim 2, said first angle of depression being adjacent said heads of said depressions in said housing and in said actuator.

4. The ball ramp brake of claim 3, further comprising a plurality of balls received in and between said depressions in said actuator and in said housing, said balls being positioned in said heads of said depressions in said actuator and in said housing when said actuator is in an unactuated position.

5. The ball ramp brake of claim 4, further comprising an annular ball cage positioned between said actuator and said housing and having a plurality of openings therein, said openings receiving said balls therethrough, and said ball cage being adapted to restrict radial movement of said balls and including a spring attached thereto to bias said balls in said second circumferential direction.

6. The ball ramp brake of claim 1, further comprising an inner chamber defined by said housing, a cylinder adapted to be in fluid communication with a hydraulic actuating mechanism, said cylinder having a bore therein with an opening at one end of said bore, a piston slidably received within said bore to define a fluid chamber, a pushrod engaged by said piston and extending through said opening to engage said rotating actuator, and a seal positioned around said pushrod and over said opening, said seal isolating said fluid chamber from said inner chamber of said housing.

* * * * *